United States Patent Office 2,890,108
Patented June 9, 1959

2,890,108
CATALYZED METAL FUEL

Harry A. Toulmin, Jr., Dayton, Ohio, assignor, by mesne assignments, to Commonwealth Engineering Company, Dayton, Ohio, a corporation of Delaware No Drawing. Application September 2, 1954
Serial No. 453,933

5 Claims. (Cl. 52—.5)

The invention is particularly useful in providing a fuel comprising for example powdered metals which burn easily and quickly to produce ultrahigh heating temperatures and high velocity gases and such as heretofore has not been attained with conventional fuels.

It is a principal object of the invention to provide a catalyzed powdered metal useful as a suitable fuel in jet airplane engines, gas turbines, explosives, propellants, rockets, power plants, and the like, as used in the fields of aviation, rail transportation, agricultural distribution systems for fertilizer and insecticides, destruction of vegetation, and as may be useful for military purposes, as for example flame throwers, fire bombs, etc.

It is another object of the invention to provide a composition useful as fuels, explosive products or as ignition catalysts for initiating and promoting high temperature reactions and high velocity hot gases.

It is another object of the invention to provide a combustible composition which has very short flame propulsion area and which exhibits an accelerated rate of combustion due to the highly pyrophoric character of the fuel mixture.

It is another object of the invention to provide a powdered metal fuel mixture which may be used in the form of a slurry containing metal and auto-oxidation catalyst dispersed in a liquid hydrocarbon, and which produces a large amount of exothermic heat during combustion.

A still further object of the invention is to provide a method for accelerating the combustion of powdered metals and the like materials whereby the flame spreads through the mass of fuel and brings about the exploding and rapid disintegration of each of the particles of the metal. The powdered fuel mixture of the invention is characterized by exhibiting a high flame speed during combustion and the production of a high pressure area. By utilizing a proper concentration of the metal dust and auto-oxidation catalysts, and dispersing the same while introducing a sufficient supply of air or oxygen to provide for complete combustion of the metal dust, maximum evolution of heat is obtained during combustion of the dust.

In accordance with the invention, a basic process is provided for obtaining the maximum heat of combustion from fuels especially powdered metals. The invention will be described more particularly with reference to the use of powdered aluminum and magnesium metals, however, other combustible materials of similar nature also may be used or admixed therewith to provide an improved fuel.

In preparing the fuel mixture powdered metal material, for example aluminum or magnesium metal particles are mixed with a catalyst such as a metallic soap. The particle size of the metal is generally on the order of 20 microns or less and preferably a micron or less in diameter. This mixture of metal dust and metallic material may be used as a dry powder fuel or admixed with liquid hydrocarbon to form a slurry.

To catalyze and enhance the combustion rate of the powdered metal materials and produce a high temperature reaction, there is introduced a small amount of a metallic soap or mixture of such metallic soaps, for example 0.1 to 5% by weight of the powdered metal constituents comprises a metallic soap such as a stearate, palmitate, oleate, ricinoleate, etc., of aluminum, magnesium, titanium, zirconium, tin and the like which compounds exhibit auto-oxidation catalytic properties. The metal particles of the fuel mixture are in the form of dust or flakes, with metallic soap being preferably coated on or admixed with the flakes of metal, e.g., aluminum metal flakes coated with aluminum stearate forms an excellent fuel mixture. Mercury metal in small amounts, e.g., 0.1 to 1% by weight of the fuel powder mixture also may be added to enhance the catalytic action. Mercury compounds, such as mercury peroxide or fulminate, may be used in place of mercury metal for this purpose.

Where the fuel is to be employed as a liquid, the metal particles in the form of flakes or dust and catalytic substance are dispersed in a liquid hydrocarbon, for example kerosene, gasoline, diesel oil, etc., which provides a liquid combustible carrier for the powdered metal materials. Such a fuel is useful for operating jet engines and high temperature fuel operated prime movers, and where the maximum B.t.u.'s are to be extracted from the burning fuel in a predetermined time.

For promoting the oxidation and increasing the speed of burning of the fuel, a peroxide such as hydrogen or benzyl peroxide etc. may be introduced into the fuel mixture initially or during the burning of the same. For this purpose 0.5 to 2% by weight of the fuel solids may comprise a peroxide.

As specific examples of the improved powdered metal fuel of this invention aluminum metal dust, preferably as powdered metal foil of a particle fineness of an average size of one micron is coated with aluminum stearate (0.1 to 5% by weight of the powdered metal mixture). In place of aluminum metal, magnesium metal or other readily oxidizable metals such as zinc, tin, zirconium, titanium, etc. metal particles in the form of dust or flakes, may be used. Aluminum flakes coated with a small amount of aluminum or magnesium stearate, or the like metallic soap as aforementioned provides a suitable fuel mixture.

The metallic soaps utilized as auto-oxidation catalysts are preferably salts of metals in groups II, III and IV of the periodic table, representatives of which are the stearates or palmitates of aluminum, magnesium, titanium, zirconium and tin.

The powdered metal fuel mixture also may be used in the form of a slurry, the same being admixed with liquid hydrocarbon. For example, powdered metal such as aluminum metal flakes, with metallic soap, e.g., aluminum stearate is introduced into a liquid hydrocarbon carrier such as gasoline, kerosene, fuel oil, or the like. This slurry of oil and metal particles may be sprayed into a combustion chamber of engine and mixed with air or oxygen and burned. In general, one to twenty-five parts of the solid fuel constituents to 100 parts by weight of the liquid hydrocarbon provides a suitable liquid fuel mixture. Higher or lower proportionate amounts of the liquid hydrocarbon and powdered fuel constituents may be employed as needed, to provide a fuel having the requisite consistency and burning characteristics desired. The powdered metal may be mixed with the liquid hydrocarbon either before or during burning of the fuel. Additional oxygen in the form of peroxides, e.g., benzyl peroxide may be added as a supplement to air for increasing the speed of burning or combustion of the fuel mixture as aforementioned.

The presence of the auto-oxidation catalyst in sufficient amount to catalyze the reaction is an essential constituent of the powdered metal fuel. The metal particles which are combustible and tend to vaporize readily produce a high temperature reaction during the combustion. The very high temperatures produced during the catalyzed reaction cause the metal particles to be rapidly disintegrated and vaporized. The combustion of the metal powder thus proceeds at a high rate, the high temperature and explosive action being enhanced by the catalytic action of the metallic soap. The high temperatures produced combined with the violent disintegration and vaporization of the powdered metal particles is believed to account for the unexpected high calorific values produced.

Heretofore, in the combustion of metal particles, the maximum B.t.u.'s have not been obtained principally because the initial heating of the particles did not result in the production of temperatures high enough to disintegrate and vaporize the metal and permit air or oxygen to come in contact with all the powdered metal particles and support its combustion to completion. In other words, under conventional combustion reactions using powdered metals there was always a certain minimum amount of the particles which were not burned to completion but passed off as smoke.

In accomplishing the high combustion and maximum extraction of B.t.u.'s from powdered metal material in accordance with this invention, it is requisite that the reaction be conducted so that the boiling point or vaporization point of the combustion material be lower than the flame temperature and that the heat of vaporization is lower than the energy required to initiate rapid surface oxidation or combustion.

The catalytic action of metallic soaps facilitates the burning of the metal dust and provides a high temperature reaction so that the maximum B.t.u.'s are obtained from the metal dust particles. During combustion of the fuel the high temperatures produced rapidly transform the metal particles into gases at high temperatures.

Further, metal powders such as aluminum or magnesium dust when used with a petroleum hydrocarbon carrier such as gasoline, kerosene, diesel oil or the like provides a fuel which is more sensitive to ignition and produces a powdered metal fluid mixture wherein the flame produced by combustion proceeds more rapidly through the fuel, than when the dust particles are employed alone. Moreover, the combustible gases formed by the hydrocarbon likewise enhance this combustion. The efficiency of the combustion and high extraction of B.t.u.'s is further facilitated due to the catalytic action of the metal particles such as magnesium or aluminum powder, particularly in the presence of hydrogen which is formed by decomposition of moisture present and under the high temperature reaction conditions during combustion of the fuel.

In addition to the high rate of reaction and production of high temperatures during combustion of these metal dust particles and which comprise oxygen adsorbed on the dust particles, it has been found that the addition of a small amount of a metallic soap such as aforementioned, for example aluminum, magnesium stearate or oleate or the like, will further accelerate this ignition and flame propagation during combustion of the fuel. This is probably due to the fact that the porous surface of the particles adsorb gas from the surrounding atmosphere and the metallic soap catalyzes the reaction.

To control the combustion and prevent explosion and to facilitate combustion an excess of oxygen in the atmosphere is preferred and is introduced into the fuel either from the air or from the use of a mixture of air and peroxide, as heretofore explained. In this manner it is possible to produce the combustion at a lower ignition temperature and increase the rate of combustion and the adsorption of oxygen on the dust particles.

Metal particles such as aluminum, magnesium, zinc and the like oxidizable material in the form of dust ignited in the presence of metallic soap catalytic agent burns at a high rate and temperature. The combustion rate promoting catalysts produce a powdered metal fuel which has a lower explosive limit or temperature, particularly in the presence of methane, oxygen or air, and results in the enhancement of the combustion of the fuel.

Control of the combustion and explosive properties of the powdered metal can be effected by utilizing different oxidizing agents and in various proportions. In this manner the incendiary action of the fuel may be controlled so as to either accelerate the combustion or burning up of the fuel particles or slow down their combustion as may be required in the use of the fuel. Thus, for making a fuel useful in internal combustion engines utilizing powdered metal material, the combustion may be speeded up by the use of metallic soap and peroxide catalysts so that the mixture will burn and provide the high temperature reaction gases necessary to propel the piston in a predetermined time. In other instances where the fuel is required to burn more slowly, the use of negative catalysts such as those which do not accelerate the combustion but tend to decelerate the combustion are incorporated in the fuel.

In the case of metal dust such as aluminum dust and similar metal dust, the ignition of the same is believed to have an electric or electronic origin as opposed to thermal ignition. The electrical discharges or ionization is believed to produce ozone and aluminum oxide ($Al_2O_5$) which reacts with the fine dust particles and initiates the decomposition of the same and flame propagation during the combustion of the fuel.

The electrical ignition depends largely upon the production of a sufficient concentration of charged particles and which results from electronic collisions due to ionization of the materials or the presence of ions or ionized particles in the explosive mixture. This electronic phase of the combustion is believed to play an important role in the increased efficiency of the fuel of this invention. The same is substantially true in the case of thermal ignition.

It is also considered to be immaterial whether the theory of predistillation of dust during ignition and combustion takes place or whether such a theory may be used to explain what happens to the fuel during combustion, or whether it involves some other theory for the production of the improved results. In the case of the predistillation theory of dust ignition, it is believed that all dust ignition involves purely a gas or vapor explosion and that the energy of the ignition source provides heat to decompose the dust particles thus causing the evolution of the volatile matter. In this manner the volatilized gassy particles mix more readily with air and ignite and the combustion proceeds at a high rate and the heat produced in turn further heats and volatilizes other particles not yet volatilized.

One of the objections made to the above theory has been that the ignition temperature of some dust, including coal, are lower than the ignition temperatures of the gases involved such as methane or the like hydrocarbon. However, there seems to be some support for the theory that during the initial heating and combustion of the dust there is not enough air present at the surface of the particle to continue to support the combustion, and consequently the temperature rises above the ignition point of the solid causing it to distill and eventually to ignite, thus initiating the combustion reaction.

In the preferred process of carrying out the combustion of the novel fuel of this invention, it is sought to have the concentration such as will provide sufficient heat to produce complete oxidation of the dust particles and thus release the maximum B.t.u.'s. The heat produced by complete oxidation of a portion of the dust particles in the available oxygen is enough to heat the rest of the dust in the mixture to bring the same to the ignition temperature. Theoretically, neglecting disassociation, the strongest explosion or greatest explosive force should be produced at a concentration corresponding to stoichiometric weight mixtures of the fuel ingredients. This can be computed if the chemical composition of the dust is known and provided complete combustion of the material is assumed to take place. In practice, however, somewhat richer dust mixtures are found to be the most explosive.

The adjustment of these mixtures to provide the greatest heat production is facilitated by the catalytic action of the metal powder, for example powdered metal such as aluminum, magnesium, zinc, tin, etc. and the fluid carrier which is preferably hydrocarbon as described. The initial temperature, pressure, oxygen content, humidity, specific heat and heat conductivity of the atmosphere all are factors which influence the dust explosion. The presence of oxygen is, of course, a most important factor.

As a source of ignition it is preferred to utilize a flame or hot surface. The presence of moisture which normally is a constituent of the mixture is advantageous since it reacts with the metal powder and similar materials at the reaction temperatures and results in the evolution of hydrogen gas. The production of hydrogen gas is effected particularly at elevated temperatures wherein decomposition and ionization of moisture is produced. This reduces the surface oxide coating which would otherwise tend to form on the particles and thus makes the fuel mixture highly sensitive to ignition and combustion.

Other pyrophoric metal dust particles may be present such as finely divided metal powders of iron, manganese, copper, uranium, nickel, zirconium and others, metal oxides, hydrides, carbides, nitrides and metal alloys which also oxidize so rapidly on exposure to air that they heat and ignite. While there is no apparent agreement regarding the exact mechanism of the pyrophoric ignition, it is believed that the process varies somewhat with the type of dust, its fineness and surface character.

The basic discovery in this invention is that by utilizing a combination of combustible metal dust with coal dust that the combustion can be achieved and controlled whereby the maximum liberation of gas and heat results from the reaction. The pyrophricity of these dusts, as hereinbefore mentioned, is believed to be related to a metastable internal equilibrium in the powders. Thus, one of the advantages of utilizing these dusts of pyrophoric character, such as aluminum and/or magnesium metal dusts, is that with a sufficient dispersion of these extremely fine particles, the same will self-ignite by an electrostatic spark discharge within the cloud of dust.

Particularly satisfactory results have been secured with dust samples of finer than 200-mesh. This fuel can be passed through an electrically heated cylindrical alundum-core furnace construction for ignition. The ignition temperatures for the dust will range from about 200° C. to more than 1000° C. These figures depend upon the dispersibility, fineness, uniformity of the dust, the ignition source, the timing of ignition and the interpretation of what constitutes limiting flame propagation.

The igniting energy of these dust clouds vary with the fineness, the moisture content and somewhat with the concentration in the cloud. For instance, undispersed layers of zirconium powder have been ignited by sparks of less than 1 microjoule (1 muj.) energy while other dusts take considerably stronger sparks. The igniting energy of dust clouds in air ranges from about 10 millijoules (10 mj.) to several joules.

The igniting source generally preferred is a high voltage induction spark. When these dusts are thus ignited the pressure is developed to more than 150 lb./in.$^2$ and rises to an average rate of pressure of about 5000 lb./in.$^2$ per second and the maximum rates to more than 10,000 lb./in.$^2$ per second. When using a high voltage continuous induction spark and dispersing the dust through a furnace at 850° C. a satisfactory result can be secured.

The minimum concentration of coal dust that will propagate large-scale explosions is approximately 50 mg./liter (0.05 oz./ft.$^3$) of air. Pressure is nearly 150 lb./in.$^2$ and flame velocities in excess of 6000 ft./sec. have been accomplished by the employment of the thermal properties of the metal dust and the catalysts, e.g., aluminum flakes and similar other dusts. As hereinbefore stated, in the presence of a liquid hydrocarbon fuel and oxygen, it is possible to achieve temperature and gas velocities of great magnitude and by adjusting the fineness of the materials involved, the amount of moisture present and the oxygen, the maximum energy can be released.

It will thus be seen that the present invention provides a novel fuel and method of producing high temperature combustion reactions, and wherein metal dust particles form a principal constituent.

Further, the invention provides a fuel wherein a catalyzed metal dust is utilized to produce a high temperature fuel and wherein the maximum B.t.u. values are obtained.

It is understood that various changes and additions may be made in compounding the fuel of this invention and that the proportionate amount of ingredients may be varied over a relatively wide range, depending upon the particular use to which the fuel is to be put. Such changes and variations are contemplated to come within the spirit and scope of this invention, and which are more particularly set forth in the appended claims.

What is claimed is:

1. A fuel consisting essentially of a liquid slurry composed of liquid hydrocarbon, and as solid fuel constituents finely divided metal selected from the group consisting of aluminum, magnesium, titanium, zinc, tin and zirconium, and aluminum stearate in the amount of 0.1 to 5.0% by weight of the finely divided metal, said solid fuel constituents comprising from 1 to 25 parts per 100 parts by weight of said liquid hydrocarbon.

2. A fuel consisting essentially of a liquid slurry composed of liquid hydrocarbon, and as solid fuel constituents finely divided metal, and a metallic soap, said finely divided metal being selected from the group consisting of aluminum, magnesium, titanium, zinc, tin and zirconium, and said metallic soap being selected from the group consisting of the stearates, palmitates, ricinoleates and oleates of the metals selected from the group consisting of aluminum, magnesium, titanium, zirconium and tin, said metallic soap being introduced in the amount of 0.1 to 5.0% by weight of the finely divided metal, and said solid fuel constituents comprising from 1 to 25 parts per 100 parts by weight of said liquid hydrocarbon.

3. A fuel consisting essentially of a liquid slurry composed of liquid hydrocarbon, and as solid fuel constituents finely divided aluminum metal, and aluminum stearate, said finely divided aluminum metal having a particle size of an average of 1 micron and the aluminum stearate consisting of 0.1 to 5.0% by weight of the finely divided aluminum metal, said solid fuel constituents comprising from 1 to 25 parts per 100 parts by weight of said liquid hydrocarbon.

4. A fuel consisting essentially of a liquid slurry composed of liquid hydrocarbon, and as solid fuel constituents finely divided magnesium metal and aluminum stearate, said finely divided magnesium metal having a particle size of an average of 1 micron, said aluminum stearate consisting of 0.1 to 5.0% by weight of the finely divided magnesium metal, said solid fuel constituents comprising from 1 to 25 parts per 100 parts by weight of said liquid hydrocarbon.

5. A fuel consisting essentially of a liquid slurry composed of liquid hydrocarbon, and as solid fuel constituents finely divided aluminum metal and aluminum stearate, said finely divided aluminum metal having a particle size of an average of 1 micron, said aluminum stearate consisting of 0.1 to 5.0% by weight of the finely divided aluminum metal, and said fuel mixture comprising 1 to 25 parts of said solid fuel constituents to 100 parts by weight of the liquid hydrocarbon.

References Cited in the file of this patent

UNITED STATES PATENTS

| | | |
|---|---|---|
| 2,310,061 | Bowen | Feb. 2, 1943 |
| 2,461,797 | Zwicky | Feb. 15, 1949 |
| 2,477,549 | Van Loenen | July 26, 1949 |
| 2,530,493 | Van Loenen | Nov. 21, 1950 |
| 2,560,542 | Bartleson et al. | July 17, 1951 |
| 2,570,990 | Southern et al. | Oct. 9, 1951 |
| 2,573,471 | Malina et al. | Oct. 30, 1951 |
| 2,579,257 | Hansley et al. | Dec. 18, 1951 |